United States Patent [19]

Hayama et al.

[11] 4,139,759
[45] Feb. 13, 1979

[54] EXPOSURE DEVICE FOR A THERMAL STENCIL SHEET

[75] Inventors: Noboru Hayama, Tokyo; Takanori Hasegawa, Hachioji; Kiyoshi Takehara, Kokubunji; Masakazu Kera, Tokyo, all of Japan

[73] Assignee: Riso Kagaku Corporation, Tokyo, Japan

[21] Appl. No.: 860,166

[22] Filed: Dec. 13, 1977

[30] Foreign Application Priority Data

Dec. 23, 1976 [JP] Japan ................................. 51-155402

[51] Int. Cl.² .............................................. H05B 1/00
[52] U.S. Cl. .................................... 219/216; 219/388; 432/59
[58] Field of Search ............. 219/216, 388; 355/3 FO; 250/317–319; 432/59, 227

[56] References Cited

U.S. PATENT DOCUMENTS

| 3,445,626 | 5/1969 | Michaels .......................... 219/388 X |
| 3,464,680 | 9/1969 | Nakamura et al. ..................... 432/59 |
| 3,903,394 | 9/1975 | Mullen ................................. 219/216 |

*Primary Examiner*—C. L. Albritton
*Attorney, Agent, or Firm*—Stevens, Davis, Miller & Mosher

[57] ABSTRACT

An exposure device for a thermal stencil sheet having a linear electronic flash discharge tube and an enclosure made of a plate member curved around the tube in a substantially cylindrical shape coaxial with the tube while defining a slit opening parallel to the tube, wherein a thermal stencil sheet is loaded into the enclosure through the slit opening and is supported in a substantially cylindrical shape coaxially around the tube for receiving direct infrared radiation from the tube with no interposition of a glass layer or the like.

7 Claims, 2 Drawing Figures

EXPOSURE DEVICE FOR A THERMAL STENCIL SHEET

BACKGROUND OF THE INVENTION

The present invention relates to a device for exposing a thermal stencil sheet to a source of infrared rays and, more particularly, to an exposure device for a thermal stencil sheet which has an infrared ray absorbent image directly provided thereon.

As a method of perforating a thermal stencil sheet, it is known to provide an infrared ray absorbent image directly on a thermal stencil sheet by handwriting or by employing suitable duplicating means and to expose this thermal stencil sheet having the infrared ray absorbent image to a source of infrared rays so that the thermal stencil sheet is perforated in accordance with the image by the heat generated in the image due to absorption of infrared rays. Therefore, in contradistinction to an orthodox method of perforation for a thermal stencil sheet in which the thermal stencil sheet is pressed onto an image surface of an original while infrared rays are projected onto the image surface through the thermal stencil sheet so that the heat generated in the image portions of the original due to absorption of infrared rays is effectively transmitted to the thermal stencil sheet for effecting its perforation, it is not required to apply any pressing force to the aforementioned thermal stencil sheet having an infrared ray absorbent image directly provided thereon while it is exposed to a source of infrared rays for thermal perforation.

Thermal stencil sheets which are suitable for use with the aforementioned method of providing an infrared ray absorbent image directly thereon are disclosed in the co-pending patent applications Ser. Nos. 854,676 and 854,677 filed by applicant on Nov. 25, 1977 for/by the same assignee/applicant as the present application.

In order to effect uniform and proper perforation in a thermal stencil sheet directly provided with an infrared ray absorbent image, the thermal stencil sheet must be exposed to uniform radiation of infrared rays over the entire region thereof. Such an exposure can of course be performed by employing a conventional thermal stencil sheet duplicating device of the type having a transparent rotary cylinder made of glass which cooperates with an endless belt for transferring a sheet around the rotary drum so as to expose the sheet to infrared rays irradiated from a linear tungsten lamp provided along the axis of the rotary cylinder, or of the type having a flat exposure window defined by a flat glass panel to which infrared rays are radiated from an electronic flash discharge tube or tubes with the help of a reflector. However, these conventional duplicating devices are intended to be used for a duplicating process such as irradiating infrared rays onto a lamination of a thermal stencil sheet and an original while pressing the thermal stencil sheet onto the original by the provision of the transparent glass rotary drum or panel, and as a consequence, in these devices the infrared rays are radiated onto the thermal stencil sheet through a layer of glass, thereby inevitably causing a loss of energy of infrared rays. Furthermore, unless such a conventional device is already available for the purpose of performing the conventional thermal stencil sheet duplicating process, a relatively high cost is incurred in obtaining such a conventional device in order to perform a simple exposure of a thermal stencil sheet directly provided with an infrared ray absorbent image to radiation of infrared rays without requiring any application of pressing force thereto.

SUMMARY OF THE INVENTION

It is therefore the object of the present invention to provide a novel device for exposing a thermal stencil sheet directly provided with an infrared ray absorbent image to radiation of infrared rays which is much simpler in structure and less expensive than the conventional device for performing the orthodox thermal stencil sheet duplicating process.

In accordance with the present invention, the above-mentioned object is accomplished by an exposure device for a thermal stencil sheet comprising a linear electronic flash discharge tube, and an enclosure made of a plate member curved around said tube in a substantially cylindrical shape coaxial with said tube while defining a slit opening parallel to said tube, said enclosure having a substantially cylindrical inner surface adapted to receive a thermal stencil sheet introduced therein through said slit opening and curved along said inner surface.

As a result of various researches which we have performed with respect to thermal stencil sheets, particularly those which are suitable for the process of providing an infrared ray absorbent image directly thereon, such as proposed in the aforementioned patent applications, we have found that a thermal stencil sheet is effectively curved into the cylindrical shape utilising its own resilience if it is positively guided at least along its outer surface. Therefore, by employing an exposure device of the aforementioned structure, a thermal stencil sheet is well supported in the cylindrical shape around a linear electronic flash discharge tube to be coaxial therewith in a manner such as to be directly exposed to radiation of infrared rays from the linear electronic flash discharge tube positioned along the axis of curvature of the thermal stencil sheet, thereby accomplishing uniform exposure to radiation of the thermal stencil sheet and high efficiency with no interposition of a glass layer therebetween. As understood from the aforementioned principle of the present invention, the exposure device of the present invention is very simple in structure. Furthermore, due to the fact that the infrared rays irradiated from the electronic flash discharge tube are directly radiated onto the thermal stencil sheet, the efficiency of irradiation is high and the electric power source means may be of correspondingly small power. Given these conditions, it will be understood that the exposure device of the present invention is available at low cost.

In accordance with a particular feature of the present invention, an exposure device of the aforementioned basic structure may further comprise a side plate element or elements provided in said enclosure and having a circular periphery slightly spaced from the inner peripheral surface of the enclosure so as to define a peripheral slit space between the element or elements and the enclosure for guiding a thermal stencil sheet therethrough. By providing such a side plate element or elements a thermal stencil sheet is more positively supported in the cylindrical shape utilising its own resilience as well as the sandwiching function provided by the cooperation of the enclosure and the side plate element or elements.

In accordance with another particular feature of the present invention, it is desirable that the enclosure has a reflective inner surface. Furthermore, when the above-mentioned side plate element or elements are provided, it is also desirable that the element or elements have a reflective inner surface.

BRIEF DESCRIPTION OF THE DRAWINGS

The present invention will become more fully understood from the detailed description given hereinbelow and the accompanying drawings which are given by way of illustration only, and thus are not limitative of the invention, and wherein.

DESCRIPTION OF THE PREFERRED EMBODIMENT

Figure 1:
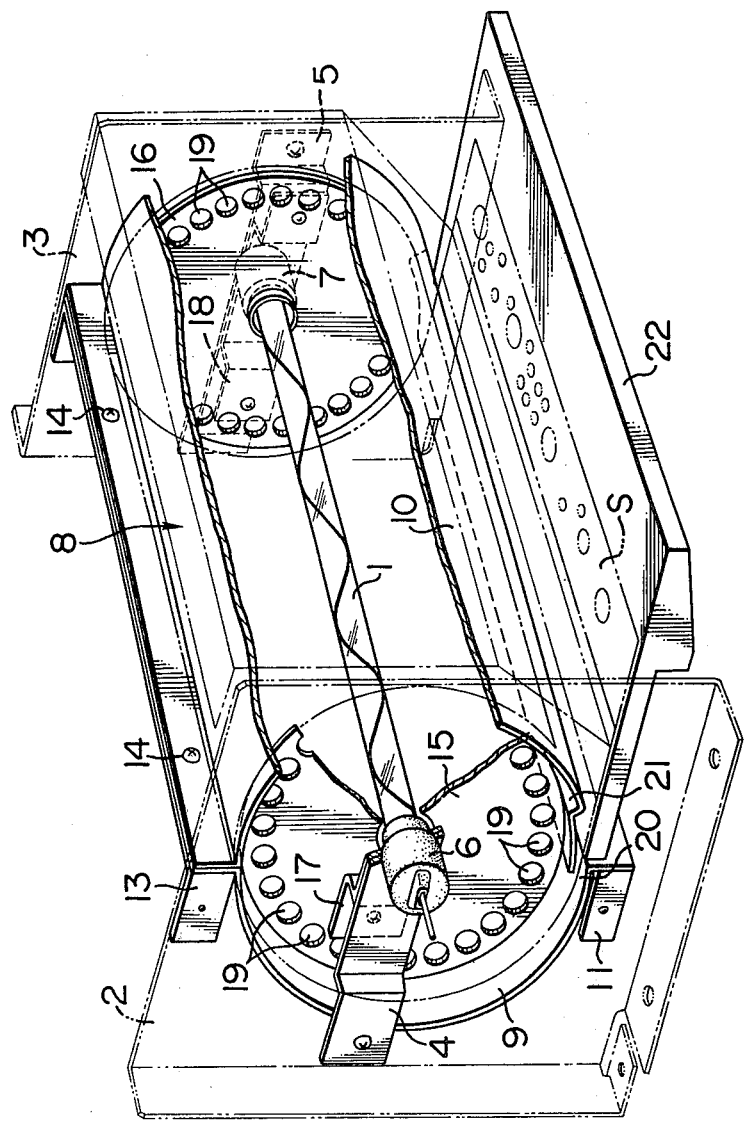
FIG. 1 is a perspective view showing an embodiment of the exposure device of the present invention with some portions being broken away for the purpose of illustration.
Figure 2:
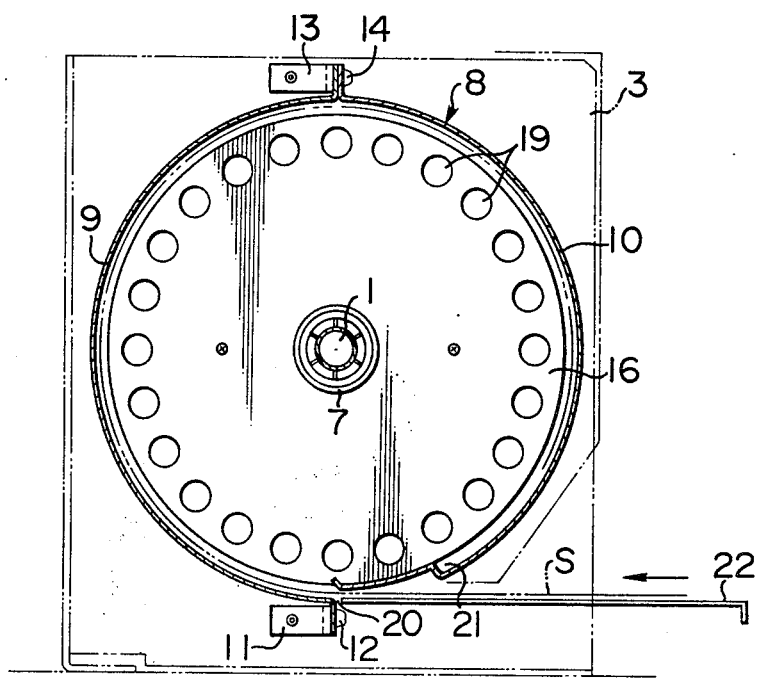
FIG. 2 is a sectional view of the device shown in FIG. 1 taken along a plane positioned at right angles to the axis of a linear electronic flash discharge tube provided in the device.

Referring to FIGS. 1 and 2, 1 designates a linear electronic flash discharge tube normally positioned horizontally and supported at opposite ends by side support plates 2 and 3 by way of support brackets 4 and 5 and sockets 6 and 7, wherein said support brackets 4 and 5 are individually mounted to said side support plates 2 and 3 at both of their ends and individually support said sockets 6 and 7 at their central portion. 8 generally designates an enclosure provided around the linear electronic flash discharge tube 1, which, in the shown embodiment, is assembled from a first semicircularly curved plate member 9 and a second semicircularly curved plate member 10 connected together at their flange portions located vertically above the discharge tube 1. The plate members 9 and 10 thus assembled provide a substantially cylindrical enclosure positioned coaxial with the linear electronic flash discharge tube 1. It is desirable that the plate members 9 and 10 have reflective inside surfaces facing the discharge tube. A flanged lower edge portion of the first semicylindrically curved plate member 9 is mounted to a lower beam member 11 by screws 12 (only one is shown), while on the other hand flanged upper edge portions of the first and second semicylindrically curved plate members 9 and 10 are all together mounted to an upper beam member 13 by screws 14. The upper and lower beam members 11 and 13 are both mounted to the side support plates 2 and 3 at their opposite ends.

Adjacent the opposite ends of the enclosure 8 are provided disc-shaped side plate elements 15 and 16 provided in the enclosure, each of said side plate elements having an outer diameter slightly smaller than the inner diameter of the substantially cylindrical enclosure 8 and being located so as to define an annular space between its outer periphery and the inner surface of the enclosure. The side plate elements 15 and 16 are individually supported by support brackets 17 and 18 which in turn are individually supported by the support brackets 4 and 5. It is desirable that the side support elements 15 and 16 have reflective inner surfaces. Furthermore, it is also desirable that the side plate elements 15 and 16 are formed with a plurality of ventilation openings 19 arranged around their outer peripheries.

The lower edge portion of the second semicylindrically curved plate member 10 is stepped inwards and connected to the side plate elements 15 and 16 so as to define a linear slit opening 20 which serves as the entrance and exit for a thermal stencil sheet such as designated by a phantom line S. A shoulder portion 21 is formed at the portion where the lower edge portion of the plate member 10 is stepped and serves as a stop means which defines the completion of the process of loading a thermal stencil sheet into the device. In the shown embodiment, a guide plate 22 is provided as normally positioned horizontally for facilitating the process of loading and unloading a thermal stencil sheet into and out of the enclosure 8.

In operation, a thermal stencil sheet provided with an infrared ray absorbent image thereon is placed on the guide plate 22 and is inserted into the enclosure 8 through the slit opening 20 until its leading edge abuts against the shoulder portion 21 so that the completion of the loading process is automatically noted. As the thermal stencil sheet is loaded into the enclosure 8, it is curved into the cylindrical shape by the guiding function applied by the inner surface of the enclosure 8 so that the sheet follows closely to the inner surface of the enclosure because of its own resilience. Furthermore, when the side plate elements 15 and 16 are provided, the thermal stencil sheet is more positively guided along the annular spaces defined between the outer peripheries of the side plate elements and the inner surface of the enclosure.

When the process of loading the thermal stencil sheet has been completed in a manner such that the leading edge of the sheet abuts the shoulder portion 21, the linear electronic flash discharge tube 1 is energised and flashed. The entire region of the sheet is uniformly exposed to the infrared radiation from the discharge tube 1, whereby the thermal stencil sheet undergoes uniform and proper perforation in accordance with the infrared ray absorbent image provided beforehand thereon. After the flashing of the discharge tube, the exposed thermal stencil sheet is unloaded from the enclosure by its trailing edge being simply pulled by hand.

The axial length and the inner diameter of the enclosure 8 are determined in accordance with the lengthwise and crosswise dimensions of the normal stencil sheets to be processed by the exposure device.

Although the two side plate elements 15 and 16 are both firmly mounted to the side support plates 2 and 3 by way of the support brackets 4, 5, 17 and 18 in the shown embodiment, it is more desirable that at least one of the two side plate elements is supported so as to be shiftable in the axial direction of the linear electronic flash discharge tube so that the spacing between the two side plate elements is adjustable in accordance with the crosswise dimension of a thermal stencil sheet to be processed. Furthermore, a pinch roller may be provided adjacent the slit opening 20 so that the process of loading and unloading a thermal stencil sheet into and out of the enclosure 8 can be performed more mechanically by merely driving the pinch roller by hand or by employing an electric motor.

Although the invention has been shown and described with respect to a preferred embodiment thereof, it should be understood by those skilled in the art that various changes and omissions in the form and detail thereof may be made therein without departing from the scope of the invention.

We claim:

1. An exposure device for a thermal stencil sheet comprising a linear electronic flash discharge tube, and an enclosure which is made of a plate member curved around said tube in a substantially cylindrical shape coaxial with said tube and which has a sole slit opening parallel to said tube, said enclosure having a substantially cylindrical inner surface adapted to receive a thermal stencil sheet introduced therein through said slit opening and curved along said inner surface, wherein said slit opening also serves as a slit opening for taking out the thermal stencil sheet which has been introduced into said enclosure and exposed to the radiation from said flash discharge tube.

2. The exposure device of claim 1, further comprising a pair of disc-shaped side plate elements provided in said enclosure adjacent to its opposite ends, said side plate elements each having an outer diameter slightly smaller than that of the inner surface of said enclosure and being arranged so as to define an annular space between the outer periphery of said side plate elements and the inner surface of said enclosure.

3. The exposure device of claim 1, wherein said enclosure has a reflective inner surface.

4. The device of claim 2, wherein said enclosure and said side plate elements have reflective inside surfaces.

5. The exposure device of claim 1, wherein said plate member forming said enclosure is formed with a shoulder portion adjacent its leading edge, said shoulder portion being adapted to serve as a stopper means which is abutted by a leading edge of a thermal stencil sheet loaded into said enclosure through said slit opening.

6. The exposure device of claim 1, wherein said plate member which forms said enclosure is divided into two parts which have individually a semicylindrically curved shape and are joined together to form said enclosure.

7. The exposure device of claim 1, further comprising a guide plate member provided to join an edge of said slit opening at one edge thereof so as to facilitate the process of loading and unloading a thermal stencil sheet into and out of said enclosure through said slit opening.

* * * * *